(12) United States Patent
Yoshida

(10) Patent No.: US 7,186,086 B2
(45) Date of Patent: Mar. 6, 2007

(54) SEPARABLE BLADE FOR WIND TURBINE

(75) Inventor: Shigeo Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 153 days.

(21) Appl. No.: 11/048,736

(22) Filed: Feb. 3, 2005

(65) Prior Publication Data
US 2005/0175457 A1   Aug. 11, 2005

(30) Foreign Application Priority Data
Feb. 5, 2004   (JP)   ............................. 2004-029234

(51) Int. Cl.
F03D 11/00   (2006.01)
(52) U.S. Cl. .................. 416/146 R; 416/230; 416/225
(58) Field of Classification Search ................ 416/224, 416/225, 229 R, 230, 231 B, 146 R
See application file for complete search history.

(56) References Cited

U.S. PATENT DOCUMENTS 4,389,162 A * 6/1983 Doellinger et al. ......... 416/225
6,612,810 B1 * 9/2003 Olsen et al. ................... 416/95
7,040,864 B2 * 5/2006 Johansen et al. ........ 416/146 R

OTHER PUBLICATIONS

IEC/TC88, IEC61400-24, Ed. 1: Wind turbine generator systems—Part 24: Lighting protection for wind turbines, p. 34.

* cited by examiner

Primary Examiner—Ninh H. Nguyen
(74) Attorney, Agent, or Firm—Birch, Stewart, Kolasch & Birch, LLP

(57) ABSTRACT

A separable blade for a wind turbine, the separable blade being divided at a center part thereof in a longitudinal direction into an inner blade portion corresponding to a blade root side and an outer blade portion corresponding to a blade end portion, wherein the separable blade is structured by joining the inner blade portion and the outer blade portion with a joining member made of metal, the separable blade includes: a metal plate placed between the inner blade portion and the outer blade portion and electrically connected to the joining member; and an in-blade electrical conduction wire arranged to extend from the metal plate through a blade root part of the inner blade portion to outside of the blade.

16 Claims, 2 Drawing Sheets

SEPARABLE BLADE FOR WIND TURBINE

CROSS-REFERENCE TO RELATED APPLICATION

This application claims priority to Japanese Patent Application No. 2004-29234 filed on Feb. 5, 2004, which is incorporated herein by reference in its entirety.

BACKGROUND OF THE INVENTION

1. Field of the Invention

The present invention relates to a separable blade for a wind turbine with a lightning protection device.

2. Description of Related Art

These days, a wind turbine is in practical use. In recent years, in consideration of increasing cases of installing wind turbines at a mountainous area or the like, various proposals have been made for protecting a blade of a wind turbine from lightning.

What is proposed as one example is a technology in which a lightning receptor is placed at an edge part of a blade of a wind turbine, and an electrical conduction wire which extends from the lightning receiving unit up to the edge part of the blade is placed within the blade or on the blade surface, so that the lightning current is guided to a hub through these lightning receiving unit and the electrical conduction wire (for example, see p. 34 IEC/TC88, "Wind turbine generator systems-Part24:Lightning protection for wind turbines", IEC61400-24, Ed.1, IEC, Oct. 22, 1999).

Meanwhile, in conjunction with a request of large-sizing a wind turbine these days, there is an emerging problem in transportation of wind turbine blades. In order to solve such a problem, what is proposed is a technology in which a large-sized blade is divided in its longitudinal direction for transportation, and the divided pieces of blades are joined by using a junction portion made of metal, such as a barrel nut, a tension bolt or the like, at a setting location.

However, if such a separable blade is adopted, there is a new emerging problem that the blade can be broken when lightning strikes the above-described joining member made of metal.

SUMMARY OF THE INVENTION

An object of the present invention is to protect a separable blade for a wind turbine and a wind turbine comprising the separable blade from lightning.

In accordance with a first aspect of the present invention, a separable blade for a wind turbine is divided at a center part thereof in a longitudinal direction into an inner blade portion corresponding to a blade root side and an outer blade portion corresponding to a blade end portion, the separable blade comprising: a joining member for joining the inner blade portion and the outer blade portion so as to structure the separable blade; a metal plate placed between the inner blade portion and the outer blade portion and electrically connected to the joining member; and an in-blade electrical conduction wire arranged to extend from the metal plate through a blade root part of the inner blade portion to outside of the blade.

According to the blade of the first aspect of the present invention, a metal plate is placed between an inner blade portion and an outer blade portion structuring the blade, and the metal plate is electrically connected to a joining member made of metal. Further, an in-blade electrical conduction wire is placed so as to extend from the metal plate through a blade root part of the inner blade portion to outside of the blade. Therefore, when lightning strikes the joining member of the blade, it is possible to guide the lightning current to outside of the blade through the metal plate and the in-blade electrical conduction wire. As a result, it is possible to prevent breakage of the blade caused by lightning.

Preferably, in the blade of the first aspect, the metal plate has a flat shape being approximately identical to a cross section shape of a junction part between the inner blade portion and the outer blade portion, to bear load affecting the inner blade portion and the outer blade portion.

According to the above-described blade, the metal plate has a flat shape being approximately identical to a section shape at a junction part between the inner blade portion and the outer blade portion, and also functions as "rib", which bears torsion load affecting the inner blade portion and the outer blade portion. Therefore, it is possible to prevent the blade from buckling.

Preferably, in the blade of the first aspect, the metal plate comprises: an inner blade side metal plate fixed to an edge surface of a blade edge side of the inner blade portion; and an outer blade side metal plate fixed to an edge surface of a blade root side of the outer blade portion and electrically connected to the inner blade side metal plate.

In accordance with a second aspect of the present invention, a lightning protection device of a wind turbine with a separable blade for the wind turbine, the separable blade being divided at a center part thereof in a longitudinal direction into an inner blade portion corresponding to a blade root side and an outer blade portion corresponding to a blade end portion, comprises: a joining member for joining the inner blade portion and the outer blade portion so as to structure the separable blade; a metal plate placed between the inner blade portion and the outer blade portion and electrically connected to the joining member; and an in-blade electrical conduction wire arranged to extend from the metal plate through a blade root part of the inner blade portion to outside of the blade; a ground metal plate; and a ground electrical conduction section for electrically connecting the ground metal plate and the in-blade electrical conduction wire of the separable blade for the wind turbine.

According to the device of the second aspect, the ground metal plate and the in-blade electrical conduction wire are electrically connected by a ground electrical conduction section. Therefore, when lightning strikes the joining member of the blade, it is possible to guide the lightning current to the ground sequentially through the metal plate within the blade, the in-blade electrical conduction wire, the ground electrical conduction section and the ground metal plate. As a result, it is possible to prevent breakage of the wind turbine caused by lightning.

In accordance with a third aspect of the present invention, a separable blade for a wind turbine, the separable blade being divided into a plurality of divided blade portions, comprises: at least one joining member for joining the plurality of divided blade portions so as to structure the separable blade; a metal plate placed between two divided blade portions located next to each other among the plurality of divided blade portions and electrically connected to one of the at least one joining member, and an in-blade electrical conduction wire arranged to extend from the metal plate through a blade root part of an innermost divided blade portion among the plurality of divided blade portions to outside of the separable blade.

Preferably, in the separable blade for the wind turbine of the third aspect, the metal plate has a flat shape being approximately identical to a cross section shape of a junction part between the two blade portions located next to each other, to bear load affecting the two blade portions located next to each other.

Preferably, in the separable blade for the wind turbine of the third aspect, the metal plate comprises: an inner side metal plate fixed to an edge surface of a blade edge side of an inside blade portion of the two blade portions located next to each other; and an outer side metal plate fixed to an edge surface of a blade root side of an outside blade portion of the two blade portions located next to each other and electrically connected to the inner side metal plate.

In accordance with a fourth aspect of the present invention, a lightning protection device of a wind turbine comprising the separable blade for the wind turbine according to the third aspect, further comprises a ground metal plate; and a ground electrical conduction section for electrically connecting the ground metal plate and the in-blade electrical conduction wire of the separable blade for the wind turbine.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

PREFERRED EMBODIMENTS OF THE INVENTION

Hereinafter, an embodiment of the present invention will be described with reference to drawings.

First, with reference to FIG. 1 and FIG. 2, a horizontal axis wind turbine 1 comprising a separable blade 4 regarding the present embodiment will be described.

Figure 1:
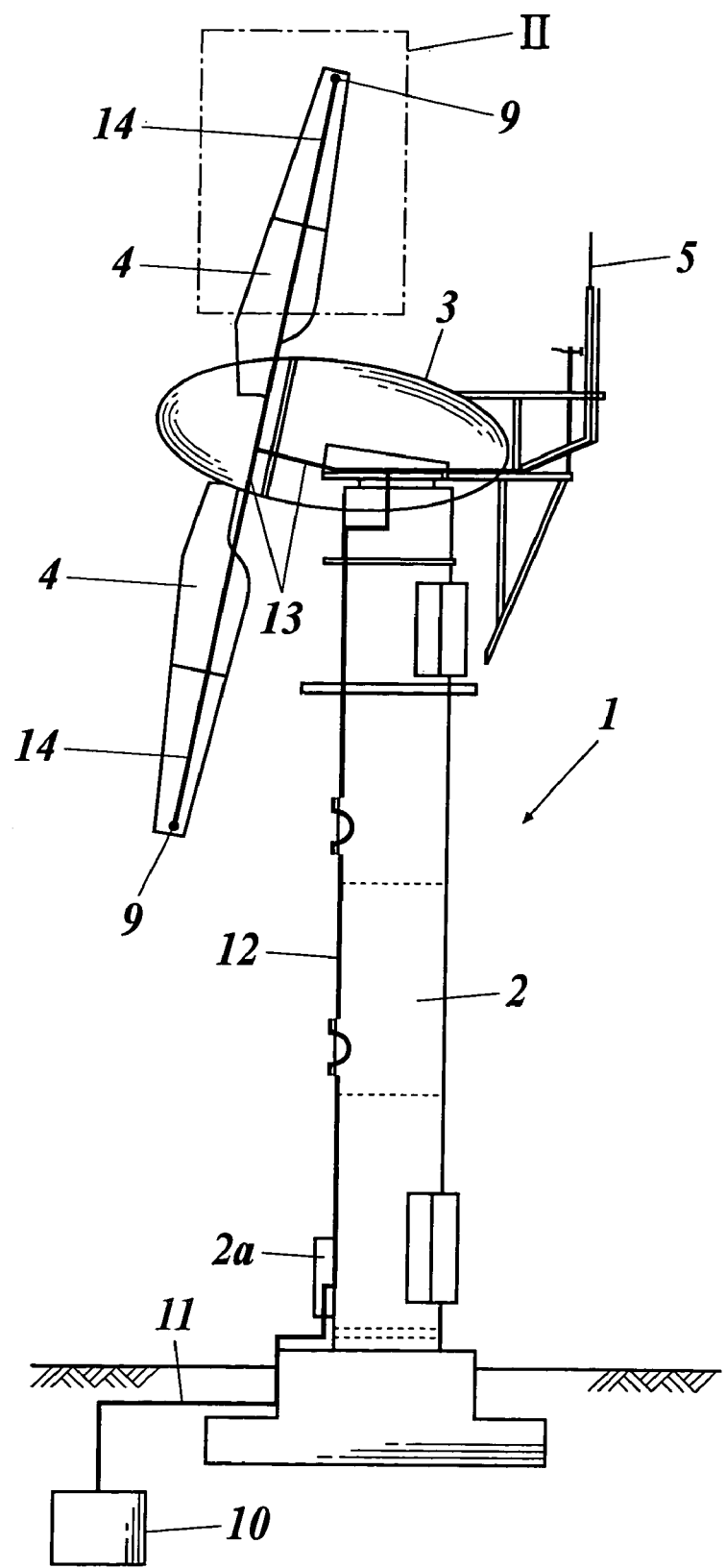
FIG. 1 is an explanatory view for explaining a structure of a horizontal axis wind turbine comprising a separable blade and a lightning protection device regarding an embodiment of the present invention.

As shown in FIG. 1, the horizontal axis wind turbine 1 comprises a tower 2 set on the ground, a nacelle 3 attached to a top part of the tower 2, two pieces of separable blades 4 attached to a main shaft located inside (illustration omitted) of the nacelle 3, and the like.

In the vicinity of a setting location of the tower 2, into the ground, a ground metal plate 10 lays underground as shown in FIG. 1, and a ground lightning conduction wire 11 is placed between the ground metal plate 10 and a ground terminal 2a of the tower 2. Further, in the tower 2, as shown in FIG. 1, an in-tower lightning conduction wire 12 is placed. A bottom of the in-tower lightning conduction wire 12 is connected to the ground terminal 2a placed at the lower part of the tower 2, whereby the in-tower lightning conduction wire 12 is electrically connected to the ground metal plate 10. Further, an upper part of the in-tower lightning conduction wire 12 is connected to an in-nacelle lightning conduction wire 13 (will be described later) placed within the nacelle 3.

Within the nacelle 3, as shown in FIG. 1, the in-nacelle lightning conduction wire 13 is placed. One edge of the in-nacelle lightning conduction wire 13 is connected to the described in-tower lightning conduction wire 12, and another edge of the in-nacelle lightning conduction wire 13 is connected to an in-blade lightning conduction wire 14 (will be described later) placed in the separable blade 4. Further, at a back of the nacelle 3, as shown in FIG. 1, a lightning rod 5 is placed. The lightning rod 5 is also connected to the in-tower lightning conduction wire 12 through the in-nacelle lightning conduction wire 13.

The separable blade 4 comprises an outer skin 4S made of fiber-reinforced plastic, and a main beam (illustration omitted) placed inside of the outer skin 4S. As shown in FIG. 1 and FIG. 2, the separable blade 4 has a divided structure according to which the separable blade 4 is divided at the center in the longitudinal direction into an inner blade portion 4R corresponding to a blade root side, and an outer blade portion 4T corresponding to a blade end side. Then, as shown in FIG. 2, a barrel nut 6 made of metal is attached to an edge part corresponding to a blade root side of the main beam of the outer blade portion 4T, and a tension bolt 7 made of metal is attached to an edge part corresponding to a blade end side of the main beam of the inner blade portion 4R. Further, by screwing the tension bolt 7 into the barrel nut 6, the inner blade portion 4R and the outer blade portion 4T are connected. The barrel nut 6 and the tension bolt 7 are a connecting member of the present invention.

Figure 2:
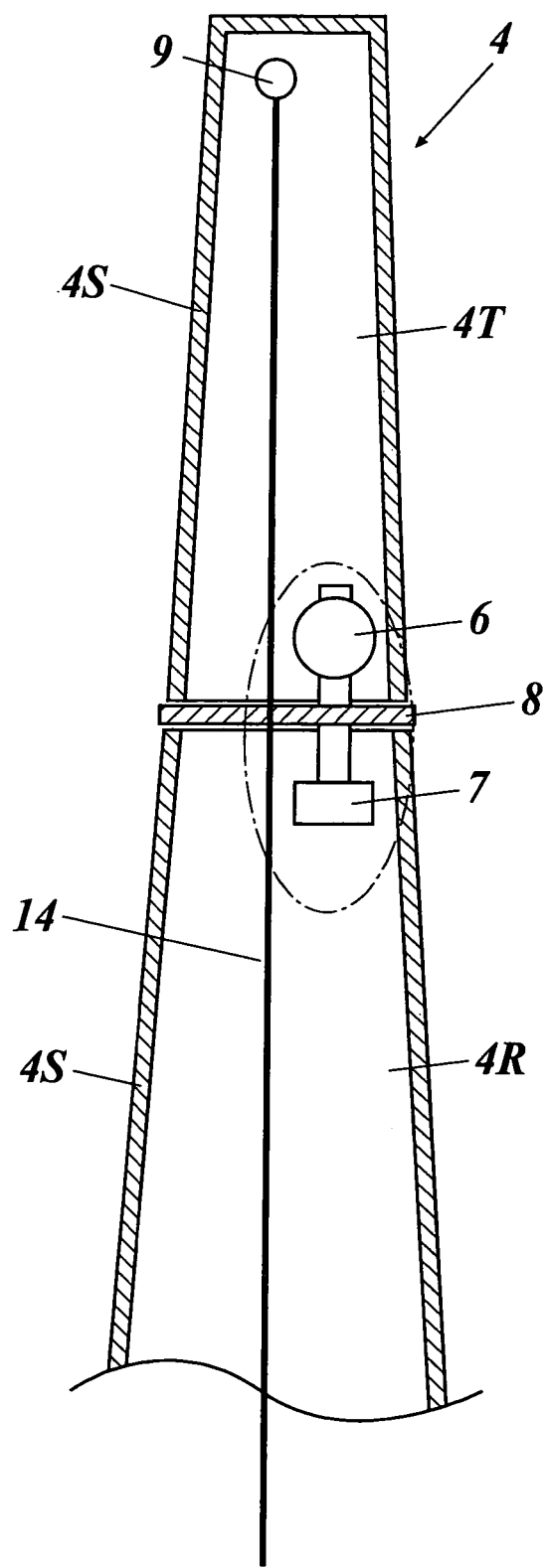
FIG. 2 is a magnified sectional view showing the separable blade (portion II in FIG. 1) of the horizontal axis wind turbine shown in FIG. 1.

Further, between the inner blade portion 4R and the outer blade portion 4T in the separable blade 4, the metal plate 8 is placed as shown in FIG. 2. A penetrating hole is provided on the metal plate 8, and when the inner blade portion 4R and the outer blade portion 4T are to be connected, after the tension bolt 7 placed at the inner blade portion 4R is inserted to the penetrating hole of the metal plate 8, the tension bolt 7 is screwed into the barrel nut 6. Further, since the barrel nut 6 and the tension bolt 7 are contacted with each other and the tension bolt 7 and the metal plate 8 are contacted with each other, the metal plate 8 is electrically connected to the barrel nut 6 and the tension bolt 7. Here, in the present embodiment, a stainless plate or aluminum plate is adopted as the metal plate 8.

Further, the metal plate 8 has a flat shape which is approximately identical to a shape of a cross section at a connecting part between the inner blade portion 4R and the outer blade portion 4T, where an edge surface of the blade edge side of the outer skin 4S of the inner blade portion 4R is contacted to the metal plate 8 and an edge surface of the blade root side of the outer skin 4S of the outer blade portion 4T is contacted to the metal plate 8. Therefore, the metal plate 8 also functions as "rib" bearing torsion load affecting the inner blade portion 4R and the outer blade portion 4T, whereby it is possible to prevent a buckling of the separable blade 4.

Further, at a blade edge part of the outer blade portion 4T of the separable blade 4, as shown in FIG. 1 and FIG. 2, a lightning receptor 9 comprising metal pieces is placed. Further, inside of the separable blade 4, as shown in FIG. 1 and FIG. 2, an in-blade lightning conduction wire 14 is placed from the blade edge part to the blade root part. One edge of the in-blade lightning conduction wire 14 is connected to the described lightning receptor 9, and another edge of the in-blade lightning conduction wire 14 is connected to the described in-nacelle lightning conduction wire 13. Further, the in-blade lightning conduction wire 14 and the metal plate 8 are electrically connected.

The lightning protection device of the horizontal axis wind turbine 1 according to the present embodiment comprises the described ground metal plate 10, the ground lightning conduction wire 11, the in-tower lightning conduction wire 12, the in-nacelle lightning conduction wire 13, and the in-blade lightning conduction wire 14. In the present embodiment, a aluminum plate is adopted as the ground metal plate 10. Further, the ground light protection copper wire 11, the in-tower lightning conduction wire 12 and the in-nacelle lightning conduction wire 13 are used to connect the ground metal plate 10 and the in-blade lightning conduction wire 14, and structures a ground electrical conduction section of the present invention.

Next, a lightning current guiding function of the lightning protection device of the horizontal axis wind turbine 1 according to the present embodiment will be described.

When lightning strikes the lightning receptor 9 placed in the separable blade 4 of the horizontal axis wind turbine 1, the lightning current is guided sequentially through the in-blade lightning conduction wire 14, the in-nacelle lightning conduction wire 13, the in-tower lightning conduction wire 12, the ground lightning conduction wire 11 and the ground metal plate 10, to the ground. Further, when lightning strikes the lightning rod 5 placed in the nacelle 3 of the horizontal axis wind turbine 1, the lightning current is guided sequentially through the in-nacelle lightning conduction wire 13, the in-tower lightning conduction wire 12, the ground lightning conduction wire 11 and the ground metal plate 10, to the ground (see FIG. 1).

Further, when lightning strikes the barrel nut 6 or the tension bolt 7, which join the inner blade portion 4R and the outer blade portion 4T of the separable blade 4 of the horizontal axis wind turbine 1, the lightning current is guided sequentially through the metal plate 8, the in-blade lightning conduction wire 14, the in-nacelle lightning conduction wire 13, the in-tower lightning conduction wire 12, the ground lightning conduction wire 11 and the ground metal plate 10, to the ground (see FIG. 1 and FIG. 2).

In accordance with the horizontal axis wind turbine 1 according to the above-described embodiment, the metal plate 8 is placed between the inner blade portion 4R and the outer blade portion 4T structuring the separable blade 4, and the metal plate 8 is electrically connected to a joining member (the barrel nut 6 and the tension bolt 7). Further, the in-blade lightning conduction wire 14 is placed so as to extend from the metal plate 8 through the blade root part of the inner blade portion 4R to outside of the separable blade 4. Therefore, when lightning strikes the joining member (the barrel nut 6 and the tension bolt 7) of the separable blade 4, it is possible to guide the lightning current through the metal plate 8 and the in-blade lightning conduction wire 14, to outside of the separable blade 4. As the result, it is possible to prevent breakage of the separable blade 4 caused by lightning.

Further, in the lightning protection device of the horizontal axis wind turbine 1 according to the above-described embodiment, the ground metal plate 10 and the in-blade lightning conduction wire 14 placed within the separable blade 4 are electrically connected by a ground electrical conduction section (the ground lightning conduction wire 11, the in-tower lightning conduction wire 12 and the in-nacelle lightning conduction wire 13). Therefore, when lightning strikes the joining member (the barrel nut 6 and the tension bolt 7) of the separable blade 4, it is possible to guide the lightning current sequentially through the metal plate 8 within the separable blade 4, the in-blade lightning conduction wire 14, the ground electrical conduction section and the ground metal plate 10, to the ground. As the result, it is possible to prevent breakage of the horizontal axis wind turbine caused by lightning striking the separable blade 4.

Here, in the above-described embodiment, described is the case that one sheet of the metal plate 8 is placed between the inner blade portion 4R and the outer blade portion 4T of the separable blade 4. However, the number of the metal plate is not limited to one. For example, while an inner blade side metal plate is fixed to an edge surface of the blade edge side of the inner blade portion 4R of the separable blade 4 and an outer blade side metal plate is fixed to an edge surface of the blade root side of the outer blade portion 4T, it is possible to electrically connect the two sheets of the metal plates by an electrical conduction wire.

Further, in the above-described embodiment, described is the case that "aluminum plate" is adopted as the metal plate 8 placed within the dividing blade 4 and the ground metal plate 10, and "aluminum wire" is adopted as the electrical conduction wire placed within the tower 2 and within the separable blade 4. However, it is possible to make these metal plate and electrical conduction wire of another metal, such as stainless, copper or the like.

Further, in the above-described embodiment, described is the case that "barrel nut 6 and tension bolt 7" are adopted as a joining member made of metal for joining the inner blade portion 4R and the outer blade portion 4T of the separable blade 4. However, the joining member is not limited to such a case, as long as it can join the inner blade 4R and the outer blade 4T.

While there has been described in connection with the preferred embodiment of the present invention, it is to be understood to those skilled in the art that various changes and modifications may be made therein without departing from the present invention, and it is aimed, therefore, to cover in the appended claims all such changes and modifications as fall within the true spirit and scope of the present invention.

What is claimed is:

1. A separable blade for a wind turbine, the separable blade being divided at a center part thereof in a longitudinal direction into an inner blade portion corresponding to a blade root side and an outer blade portion corresponding to a blade end portion, the separable blade comprising:
   a joining member for joining the inner blade portion and the outer blade portion so as to structure the separable blade;
   a metal plate placed between the inner blade portion and the outer blade portion and electrically connected to the joining member; and
   an in-blade electrical conduction wire arranged to extend from the metal plate through a blade root part of the inner blade portion to outside of the blade.

2. The separable blade for the wind turbine according to claim 1, wherein the metal plate has a flat shape being approximately identical to a cross section shape of a junction part between the inner blade portion and the outer blade portion, to bear load affecting the inner blade portion and the outer blade portion.

3. The separable blade for the wind turbine according to claim 2, wherein
   the metal plate comprises:
   an inner blade side metal plate fixed to an edge surface of a blade edge side of the inner blade portion; and
   an outer blade side metal plate fixed to an edge surface of a blade root side of the outer blade portion and electrically connected to the inner blade side metal plate.

4. The separable blade for the wind turbine according to claim 1, wherein
   the metal plate comprises:
   an inner blade side metal plate fixed to an edge surface of a blade edge side of the inner blade portion; and
   an outer blade side metal plate fixed to an edge surface of a blade root side of the outer blade portion and electrically connected to the inner blade side metal plate.

5. A lightning protection device of a wind turbine with a separable blade for the wind turbine, the separable blade being divided at a center part thereof in a longitudinal direction into an inner blade portion corresponding to a blade root side and an outer blade portion corresponding to a blade end portion, the lightning protection device comprising:
- a joining member for joining the inner blade portion and the outer blade portion so as to structure the separable blade;
- a metal plate placed between the inner blade portion and the outer blade portion and electrically connected to the joining member; and
- an in-blade electrical conduction wire arranged to extend from the metal plate through a blade root part of the inner blade portion to outside of the blade;
- a ground metal plate; and
- a ground electrical conduction section for electrically connecting the ground metal plate and the in-blade electrical conduction wire of the separable blade for the wind turbine.

6. The lightning protection device according to claim 5, wherein the metal plate has a flat shape being approximately identical to a cross section shape of a junction part between the inner blade portion and the outer blade portion, to bear load affecting the inner blade portion and the outer blade portion.

7. The lightning protection device according to claim 6, wherein the metal plate comprises:
- an inner blade side metal plate fixed to an edge surface of a blade edge side of the inner blade portion; and
- an outer blade side metal plate fixed to an edge surface of a blade root side of the outer blade portion and electrically connected to the inner blade side metal plate.

8. The lightning protection device according to claim 5, wherein
the metal plate comprises:
- an inner blade side metal plate fixed to an edge surface of a blade edge side of the inner blade portion; and
- an outer blade side metal plate fixed to an edge surface of a blade root side of the outer blade portion and electrically connected to the inner blade side metal plate.

9. A separable blade for a wind turbine, the separable blade being divided into a plurality of divided blade portions, the separable blade comprising:
- at least one joining member for joining the plurality of divided blade portions so as to structure the separable blade;
- a metal plate placed between two divided blade portions located next to each other among the plurality of divided blade portions and electrically connected to one of the at least one joining member, and
- an in-blade electrical conduction wire arranged to extend from the metal plate through a blade root part of an innermost divided blade portion among the plurality of divided blade portions to outside of the separable blade.

10. The separable blade for the wind turbine according to claim 9, wherein the metal plate has a flat shape being approximately identical to a cross section shape of a junction part between the two blade portions located next to each other, to bear load affecting the two blade portions located next to each other.

11. The separable blade for the wind turbine according to claim 10, wherein
the metal plate comprises:
- an inner side metal plate fixed to an edge surface of a blade edge side of an inside blade portion of the two blade portions located next to each other; and
- an outer side metal plate fixed to an edge surface of a blade root side of an outside blade portion of the two blade portions located next to each other and electrically connected to the inner side metal plate.

12. A lightning protection device of a wind turbine comprising:
- the separable blade for the wind turbine according to claim 11;
- a ground metal plate; and
- a ground electrical conduction section for electrically connecting the ground metal plate and the in-blade electrical conduction wire of the separable blade for the wind turbine.

13. A lightning protection device of a wind turbine comprising:
- the separable blade for the wind turbine according to claim 10;
- a ground metal plate; and
- a ground electrical conduction section for electrically connecting the ground metal plate and the in-blade electrical conduction wire of the separable blade for the wind turbine.

14. The separable blade for the wind turbine according to claim 9, wherein
the metal plate comprises:
- an inner side metal plate fixed to an edge surface of a blade edge side of an inside blade portion of the two blade portions located next to each other; and
- an outer side metal plate fixed to an edge surface of a blade root side of an outside blade portion of the two blade portions located next to each other and electrically connected to the inner side metal plate.

15. A lightning protection device of a wind turbine comprising:
- the separable blade for the wind turbine according to claim 14;
- a ground metal plate; and
- a ground electrical conduction section for electrically connecting the ground metal plate and the in-blade electrical conduction wire of the separable blade for the wind turbine.

16. A lightning protection device of a wind turbine comprising:
- the separable blade for the wind turbine according to claim 9;
- a ground metal plate; and
- a ground electrical conduction section for electrically connecting the ground metal plate and the in-blade electrical conduction wire of the separable blade for the wind turbine.

* * * * *